Sept. 5, 1944.  J. E. KANE  2,357,474
HAT MAKING APPARATUS
Filed Aug. 22, 1939  4 Sheets-Sheet 1
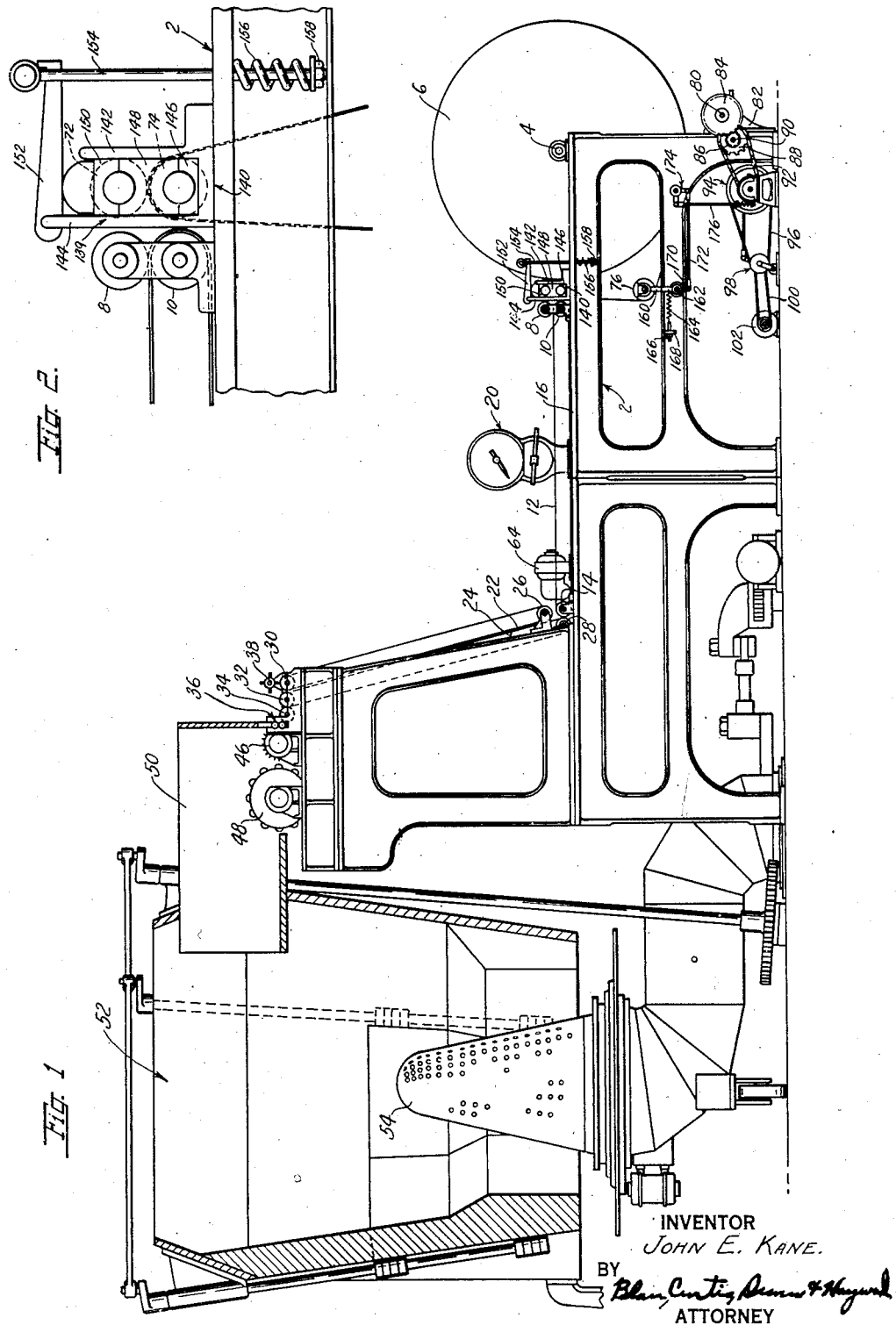
INVENTOR
JOHN E. KANE.
BY
ATTORNEY Sept. 5, 1944.　　　　J. E. KANE　　　　2,357,474
HAT MAKING APPARATUS
Filed Aug. 22, 1939　　　4 Sheets-Sheet 2
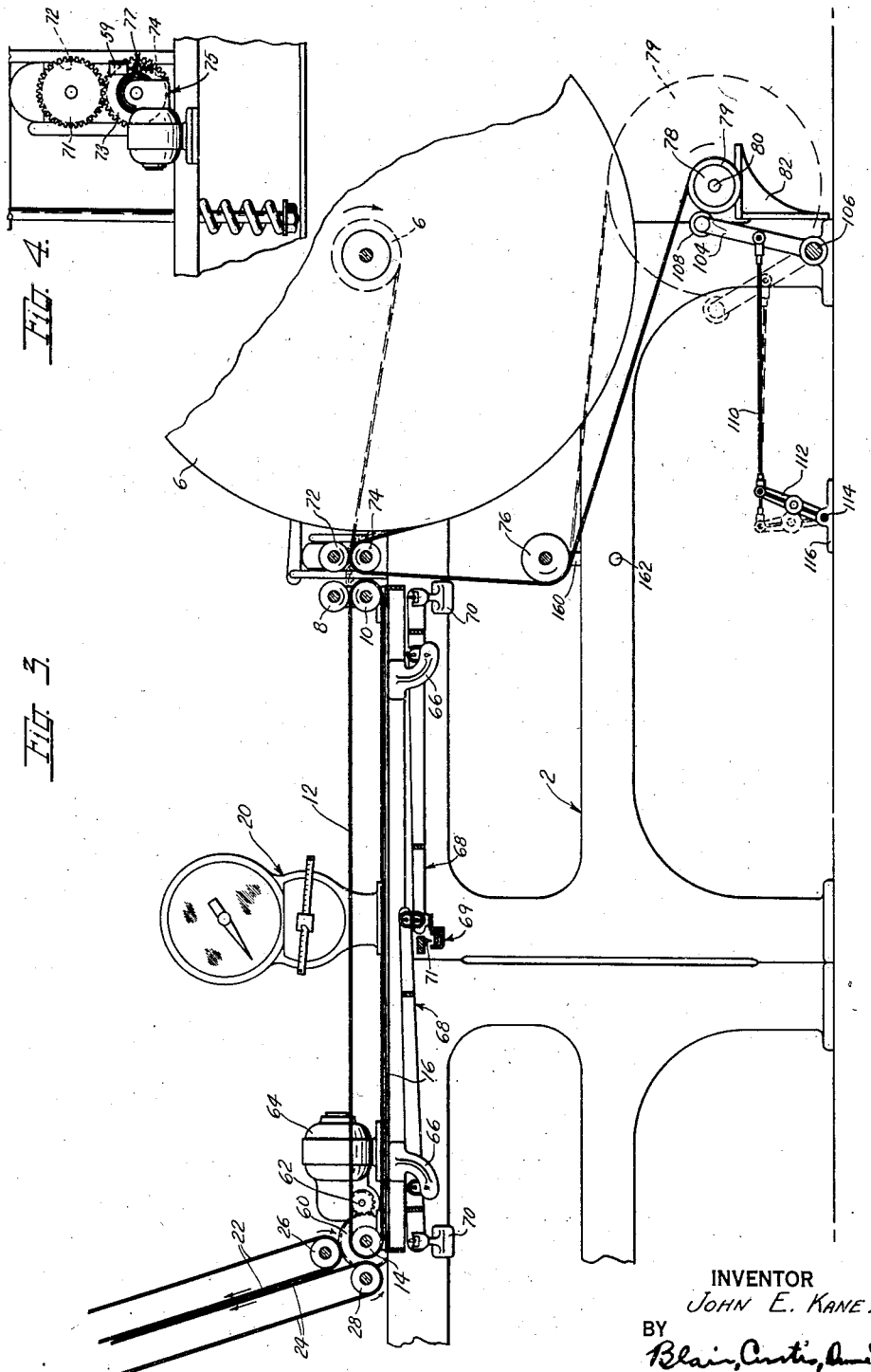
INVENTOR
JOHN E. KANE.
BY
ATTORNEY Sept. 5, 1944. J. E. KANE 2,357,474
HAT MAKING APPARATUS
Filed Aug. 22, 1939 4 Sheets-Sheet 3
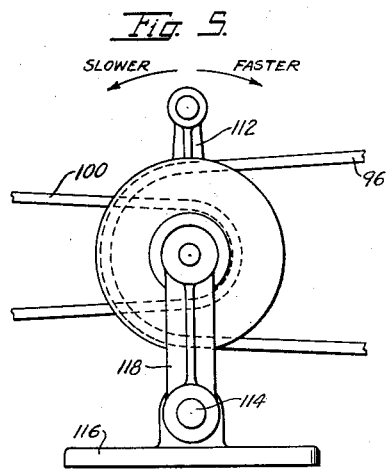
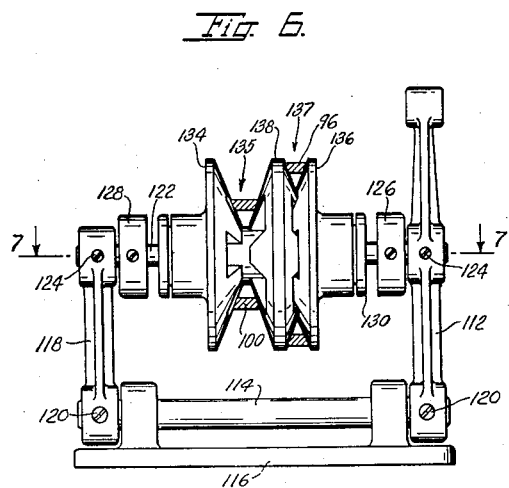
INVENTOR
JOHN E. KANE.
BY
ATTORNEY Sept. 5, 1944.    J. E. KANE    2,357,474
HAT MAKING APPARATUS
Filed Aug. 22, 1939    4 Sheets-Sheet 4

INVENTOR
JOHN E. KANE
BY
Blair, Curtis, Dunne & Hayward
ATTORNEYS

Patented Sept. 5, 1944

2,357,474

UNITED STATES PATENT OFFICE 2,357,474

HATMAKING APPARATUS

John E. Kane, Danbury, Conn., assignor to The Frank H. Lee Company, Danbury, Conn., a corporation of Connecticut Application August 22, 1939, Serial No. 291,281

17 Claims. (Cl. 19—148)

This invention relates to making felt and, more in particular, to an apparatus and a method for supplying fur to form hat bodies or bats.

An object of this invention is to provide a method and apparatus for delivering fur in a carefully controlled and efficient manner to a bat forming element, such as a perforated cone. A further object is to provide means of the above character for blowing the fur and delivering the fur after it is blown to the forming tower where bats are formed. A further object is to provide a thoroughly practical and efficient method of operation of the above character, wherein bats of predetermined characteristics may be formed. A still further object is to provide apparatus which is compact, efficient, and dependable in operation and which is sturdy in construction. These and other objects will be more fully pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings, in which is shown one embodiment of the invention:

Figure 1 is a side elevation partly in section of the bat former;

Figure 2 is an enlarged view of the feed roller unit shown at the right central position of Figure 1;

Figure 3 is an enlarged vertical section of the apparatus shown in the right hand portion of Figure 1;

Figure 4 is an enlarged view of the driving unit for the feed rollers shown in Figure 2;

Figure 5 is an enlarged view of a portion of Figure 1 showing the speed changing unit;

Figure 6 is a view from the right of Figure 5;

Figure 7 is a sectional view on the line 7—7 of Figure 6;

Figure 8 is an enlarged view of a portion of Figure 1 showing the tension control unit;

Figure 9 is a view looking from the right of Figure 8;

Figure 10 is a view on the line 10—10 of Figure 9; and,

Figure 11:
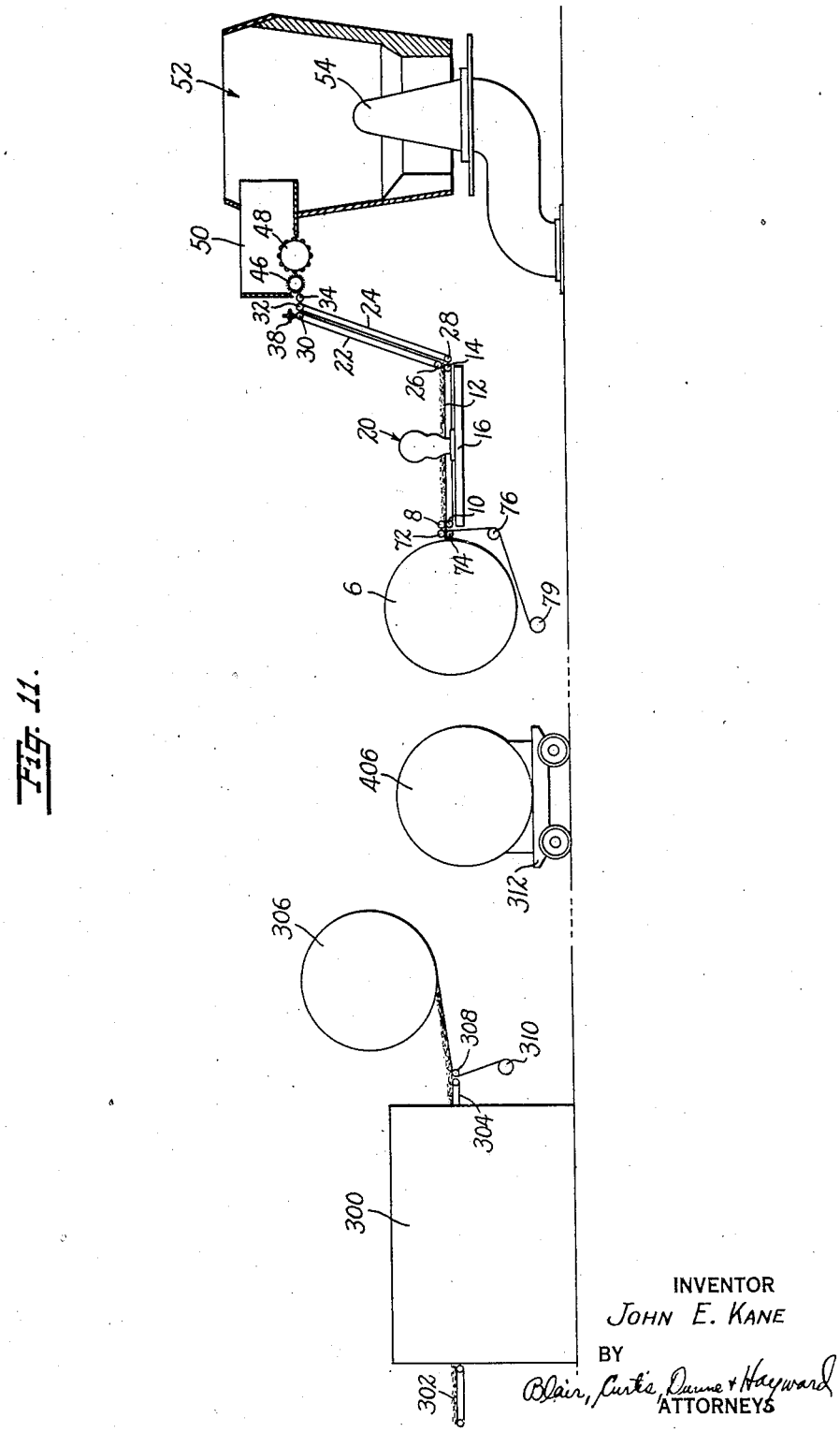
Figure 11 is a schematic representation of the apparatus for carrying out the entire process.

In the illustrative embodiment of my invention described herein, some of the apparatus is similar to that disclosed in the copending application of George T. Birdsall, Serial No. 173,285 filed November 9, 1937, issued September 12, 1939, as Patent No. 2,172,343, as well as my copending application, Serial No. 264,903, filed March 30, 1939, entitled Hat making apparatus.

In making hat bodies or bats, it is important that the process be carried on without interruption, and that the resulting bats be of a uniform high quality. Accordingly, the amount of fur which is deposited to form each bat must be carefully measured, and the fur should be deposited on the cone in a uniform manner. Thus, the individual hairs should be thoroughly separated, the fur being free of matting during weighing and when being deposited upon the cone.

At present, fur is stored in bulk after preliminary processing and during subsequent handling it may become matted, or its moisture content may change; thus hindering accurate weighing and uniform depositing on the cones. In accordance with the present invention, the fur is not stored in bulk, but in rolls of relatively thin layers. This is accomplished by winding the fur in ribbon-like form with a strip of sheet material such as paper or like material.

The last step in the processing of the fur is that of blowing, and when this is completed, the fur is removed from the blower in the form of a thin sheet or ribbon. According to this invention, this ribbon of fur is fed onto a strip of paper, and the fur and paper are wound into a compact roll. The paper is slightly wider than the ribbon of fur, and thus the ribbon of fur is covered and is tightly held between the adjacent layers of paper. These rolls of fur may be moved immediately to the bat forming machine, or the fur may be stored in this form. The rolls may be handled freely without danger of matting the fur, and when the paper is unrolled the ribbon of fur may be removed in substantially the same condition as received from the blower.

In the illustrative embodiment, particular attention is directed to the means for unrolling the paper and the ribbon of fur, and for dividing the ribbon of fur into lengths which correspond to the quantity of fur necessary to make a bat. Throughout this specification and claims the term "fur" is used in its broader sense and applies to the materials being used for making felt hats. Such fur normally includes a certain amount of "filler." Referring particularly to Figure 11, at the left-hand side a fur blower 300 is supplied at 302 with a properly proportioned mixture of fur. This fur is delivered at the right on an endless belt 304 in the form of a thin sheet or ribbon of fur which passes onto a web of paper. This paper is being continually unwound from roll 310 and passes over roller 308, and the paper and the fur are wound up into a roll 306 to thereby form a composite roll of fur and paper. At the center of the figure is shown a cart 312 carrying a roll 406 which is similar to roll 306. At the right of the figure is diagrammatically represented a bat former wherein a roll of fur 6, similar to rolls 306 and 406, is being unwound and the fur is being deposited in predetermined quantities upon cones to form bats. The details of construction of this structure are shown in Figures 1-10. Referring, particularly to Figure 1, the frame construction indicated generally at 2 supports at the right in suitable bearings 4 (only one of which is shown) the roll of paper and fur 6.

As the paper is unwound, it moves downwardly and to the right, and is wound into a roll in a manner which is more fully pointed out below. The ribbon of fur is carried to the left between a pair of rollers 8 and 10, onto an endless belt or carrier apron 12. The right end of carrier apron 12 is carried by roller 10 and the left end is carried by a roller 14. Rollers 8, 10 and 14 and carrier apron 12 are all carried upon the platform 16 of a pair of scales indicated at 20. Scales 20 are balanced for the weight of these and associated elements, and the fur is weighed as it moves to the left across carrier apron 12.

In the present embodiment, means is provided to stop the feed of the ribbon of fur when a quantity sufficient to form one bat has moved onto the carrier apron. However, the carrier apron continues in its movement and delivers this quantity of fur at the left between the contacting sides of a pair of vertically extending endless belts or aprons 22 and 24. Aprons 22 and 24 are carried at their lower ends upon rollers 26 and 28, respectively, and at the top on rollers 30 and 32, respectively. The contacting sides of aprons 22 and 24 move upwardly, and thus carry the fur up where it moves to the left to a roller 34, and the fur passes over roller 34 to a pair of feed rollers 36. Positioned above roller 30 is a rotating cleaner brush 38, which rotates clockwise to keep the fur moving to the left over roller 34 to feed rollers 36. As the ribbon of fur emerges to the left of feed rollers 36 it is caught by a top picker 46, and the fur is completely subdivided and moves over roller 48 to the left.

Top picker 46 and roller 48 are enclosed in a chute 50 which extends to the top of the forming tower, generally indicated at 52. Forming tower 52 encloses a perforated cone 54 which is supported upon a rotating base and which is provided with an internal suction, preferably in a manner more fully pointed out in my copending application. Top picker 46 and roller 48 are so adjusted that when fur is being deposited, the fur moves in a steady stream from chute 50 into the top of forming tower 52 and downwardly toward the perforated cone 54. The suction on cone 54 is sufficient to draw the individual hairs onto the cone, and a bat is formed of uniform thickness throughout.

The operation of the mechanism shown for moving the cones to and from the forming tower, and for removing the bats from the cones, is fully explained in my copending application, referred to above. Reference may be had to that application for any details of construction or operation which are convenient to the understanding of the present invention.

Reverting to the mechanism for removing the fur from the roll 6 and for dividing the fur into the quantities to form bats, certain of the details of construction are shown in Figure 3. In this embodiment, power is transmitted to carrier apron 12 at the left through roller 14 and a pair of gears 60 and 62 from a motor 64. This entire driving unit is mounted upon the scales platform 16 and the scales platform is in turn supported by means of four downwardly extending brackets 66 (only two of which are shown) resting upon a multiple-lever unit indicated at 68 which in turn is supported by four brackets 70 on base frame 2. At the center, multiple-lever unit 68 is connected to the balancing and control mechanism in a known manner.

As the paper and ribbon of fur are being unrolled, they move to the left and go between a pair of feed rollers 72 and 74. At this point the ribbon of fur moves on to the left to apron 12 and under roller 8, and the paper moves downwardly over a tension roller 76 then to the right to form a roll of paper 79 on a winding reel 78. Reel 78 is carried by a shaft 80 mounted in suitable bearings (not shown) upon brackets 82 (see also Figure 1). Shaft 80 carries a gear 84 which meshes with a gear 86 rotatably mounted upon a stud shaft 90 to rotate with a sprocket wheel 88. Sprocket wheel 88 receives power through a chain 92 from a tension control unit, indicated at 94 and to be more fully described below. Tension control unit 94 is connected to receive power through V-belt 96 from a speed-changing unit, indicated at 98 and also described below, which in turn is connected by a V-belt 100 to a motor 102.

It is important that fur be delivered to the carrier apron 12 at a constant and controlled rate, and the general control upon this rate is by means of the speed-changing unit 98. This unit tends to maintain a constant paper velocity by controlling the rate at which the paper is rolled onto reel 78. If shaft 80 were rotated at a constant rate, the velocity of the paper would gradually increase as the diameter of the roll of paper 79 (Figure 3) is increased. In overcoming this effect, the speed-changing unit is provided with a feeler 104 which is mounted to swing about its lower end upon a fixed shaft 106 and is provided at its upper end with a feeler wheel 108 which contacts the roll of paper 79. Feeler 104 is biased clockwise by a spring (not shown) and as the size of the roll of paper increases, feeler wheel 108 rides on the roll and the feeler swings to the left toward the position shown in broken lines.

Feeler 104 is connected through a feeler rod 110 to the upwardly extending leg 112 of a U-frame (Figure 6) which supports the speed-changing unit. This U-frame also includes a leg 118 at the left; both legs are rigidly held by set screws 120 on a horizontal shaft 114. Horizontal shaft 114 is in turn rockably mounted upon a base bracket 116.

Extending between the legs 112 and 118 is a shaft 122 held rigid by means of set screws 124, and respectively adjacent legs 112 and 118 upon shaft 122 are rigidly mounted bearing collars 126 and 128 (see also Figure 7). Freely mounted upon shaft 122 and adapted to slide between bearing collars 126 and 128 is a spool-like sleeve 130, which has a reduced central portion and end flanges 132. Upon the central portion of collar sleeve 130 are two similar, but reversed sheave elements 134 and 136, and freely mounted to slide between sheave elements 134 and 136 is a double-sheave element 138. The right hand side of double-sheave element 138 cooperates with sheave element 136 to form a sheave indicated at 137 for V-belt 96, while the left hand side of sheave element 138 cooperates with sheave element 134 to form a sheave indicated at 135 for V-belt 100. Segments are cut away from the central portions of the sheave elements so that the double-sheave element 138 dovetails with each of the sheave elements 134 and 136, and the sheave elements are all keyed to sleeve 130 so that they rotate together. Thus, power transmitted to sheave 135 by belt 100 (Figure 5) is delivered by sheave 137 to belt 96.

As control lever 112 moves to the left (Figures 3 and 5) indicating that the size of the roll of paper 79 has increased, the speed-changing unit moves to the left (Figure 1) to reduce the tension on V-belt 100, and increase the tension on V-belt 96. Thus, (Figure 6) V-belt 100 tends to ride up the sides of sheave elements 134 and 138, and V-belt 96 tends to move down between the sheave elements. This causes double-sheave element 138 to slide to the left, permitting V-belt 100 to ride up and V-belt 96 to ride down. This action effectively changes the ratio between the diameters of sheave 135 formed by sheave elements 134 and 138, and the sheave 137 formed by sheave elements 138 and 136, with the result that V-belt 96 is driven at a slower rate, and the paper is wound upon reel 78 at a slower rate. As pointed out above sleeve 130 may slide freely between collars 126 and 128; thus, the V-belts 96 and 100 control the position of the sleeve depending to some extent upon the relative position of the sheave element 138.

Under normal circumstances a roll of paper and fur such as 6, is placed in bearings 4, and at the same time an empty reel 78 is placed on shaft 80. Initially, shaft 80 is turned rapidly, but as roll 6 is unrolled and paper is rolled onto reel 78, the speed of rotation is gradually decreased until the entire roll 6 has been unrolled. At that time the roll of paper 79 is removed and returned to the blower to be rolled up with fur to form another roll such as 6, and the empty reel is taken from bearings 4 and connected to shaft 80 to receive the paper.

As has been indicated above, the fur is divided into separate quantities, each of which is sufficient to form a bat. This dividing process is controlled by the scales 20, and in the present embodiment, the control mechanism is connected to stop feed rollers 72 and 74 at the time the predetermined quantity of fur has been placed upon carrier apron 12. Rollers 8 and 10 and apron 12 continue to move, and thus the ribbon of fur is torn or pulled apart. In this manner cutting of the fur is avoided, and at the same time accurate weighing of fur is obtained. Subsequently, feed rollers 72 and 74 are restarted and the weighing process for the next quantity of fur begins.

As shown in Figure 4, feed rollers 72 and 74 are provided with gears 71 and 73, respectively, which mesh so that the two rollers rotate together. Gear 73 is connected through its shaft to a suitable motor and speed reduction mechanism, indicated at 75. A brake unit, indicated at 77, is provided, which is operative to stop the rotation of the rollers when the motor is deenergized. Brake unit 77 includes a solenoid 59 which is connected in parallel with the motor and which is energized to release the brake when the motor is started.

The circuit of solenoid 59 and motor 75 is controlled by a switch (see the center of Figure 3), indicated at 69, and preferably of the mercury pool type formed by a cup of mercury and a needle 71. Needle 71 is rigidly mounted upon a bracket on base frame 2, and the cup of mercury is supported by the scales arm to move away from the needle 71 when a sufficient quantity of fur has been deposited upon the platform to cause the platform to start moving downwardly. By adjusting the opening of this switch, feed rollers 72 and 74 are stopped at the proper time to tear off the proper length of the ribbon of fur, thus insuring accurate weighing of the quantities of fur.

As a result of stopping or slowing down feed rollers 72 and 74, or for other reasons, the tension of the strip of paper may be varied with undesirable results. To overcome this difficulty, means is provided to exert control upon the rotation of reel 78, depending upon the paper tension. Accordingly, the strip of paper passes tension roller 76 which is rockably mounted at its ends upon a pair of arms 160, each of which is mounted at its lower end upon a stud bolt 162. As shown in Figure 1, the arms 160 are biased counter-clockwise by a spring 164 which is connected by means of an eye-bolt 166 to a bracket 168 upon the base frame 2. Mounted upon one stud bolt 162, and rigid with respect to the adjacent arm 160 is a control arm 170 which is connected through a rocking bar 172 and a double-crank unit, indicated at 174, to a brake rod 176.

Brake rod 176 moves downwardly when tension roller 76 swings counter-clockwise due to a slackening in the tension on the paper. This movement of brake rod 176 regulates the tension-control unit 94, shown in detail in Figures 8, 9 and 10. As indicated above, tension-control unit 94 receives power through V-belt 96, and transmits power through sprocket chain 92. V-belt 96 rides upon a ring-sheave 178 which is carried by two stud shafts 190 extending oppositely from a central hub 180 into brackets 191 on ring-sheave 178. Central hub 180 is rotatably mounted upon a shaft 182 which is mounted at its ends on a pair of brackets 184 and 186 and is provided with end collars 188.

Rotatably mounted upon each of the stud shafts 190 is a beveled pinion 192, which pinions mesh at the right with a beveled gear 194 mounted upon and keyed to shaft 182. At the left, pinions 192 mesh with a similar beveled gear 196 rotatably mounted upon shaft 182; upon the left end of gear 196 is mounted a sprocket wheel 198 which carries sprocket chain 92. Also keyed to shaft 182 and mounted to the left of sprocket wheel 198 is a brake drum 200 (see Figure 8) upon which rests a brake band 202. Brake band 202 is attached at its right end through a link 206 to bracket 184, and at its left end it is provided with an eye which receives the lower end of brake rod 176. Brake rod 176 is threaded and receives a pair of spaced nuts 208 and 210. Positioned between these nuts is a compression spring 212 which holds the end of brake band 202 against nut 210. A suitable washer is positioned between the upper end of spring 212 and nut 208, and a lock nut 214 secures nut 210 in adjusted position. End thrust from gears 194 and 196 (see Figure 10) is taken at the left of sprocket wheel 198 by a thrust bearing unit 216, and at the right of beveled gear 194 by a similar thrust bearing unit 218.

During normal operation brake band 202 is tensioned sufficiently by spring 212 to reduce the speed of rotation of shaft 182. The rotation of ring-sheave 178 causes pinions 192 to roll upon gear 194 and in turn, rotate gear 196; the rotation of gear 196 rotates sprocket wheel 198 and transmits power through sprocket chain 92 and the gears to reel 78 on shaft 80. However, to the extent that shaft 182 rotates, gear 194 also rotates, and pinions 192 thus rotate gear 196 at a speed which is less than the speed of ring-sheave 178. When the tension on the paper passing tension roller 76 (Figure 1) increases, arm 160 rocks clockwise and this in turn moves brake rod 176 upwardly. The upward movement of brake rod 176 loosens brake band 202 and permits shaft 182 to increase its speed of rotation; as a result the speed of shaft 80 decreases and the tension on the paper returns to normal.

At another time, if the tension on the paper decreases, the opposite action takes place; brake band 202 grips brake drum 200 more tightly and the speed of gear 194 is reduced. This causes pinions 192 to rotate more rapidly on gear 194 and to drive gear 196 at a more rapid rate, and the tension on the paper is restored to normal.

The mounting for feed rollers 72 and 74 is shown best in Figure 2, each end of the rollers being retained in a set of sliding bearings indicated at 139. Mounted upon base frame 2 is a bracket 140 which has two vertically extending channel members 142 and 144, the channels of which face each other and cooperate to form guides for the three bearing elements 146, 148, and 150. Each of bearing elements 146 and 150 is provided with a semi-cylindrical bearing surface, and bearing element 148 is provided with two matching bearing surfaces to thereby form complete bearings for the feed rollers. These bearing elements may move upwardly but are normally forced downwardly by a lever 152 which bears against the top of bearing element 150 and which is pivoted at its left end on the top of channel member 144.

The right end of lever 152 is held by a tie-rod 154 which extends through the edge of the base frame 2; the tie-rod is biased downwardly by a compression spring 156 held against the edge of the base frame by an adjusting nut 158 upon the lower end of the tie-rod. Feed rollers 72 and 74, thus, are normally held together but they may be moved apart against the tension of spring 156; this tension may be readily adjusted by turning nut 158.

In the showing of Figure 3, the roll of paper 79 is maximum size at the time roll 6 is minimum size; thus the full size showings of the two rolls overlap. This makes it possible to space bearings 4 and shaft 80 closer together than would otherwise be possible.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In hat-making apparatus in which fur is received at the bat forming machine in the form of a ribbon-like strip of fur which is rolled with a strip of sheet material such as paper, the combination of, a pair of feed rollers through which the strip of sheet material and the fur pass, conveyor means to receive the fur from said feed rollers, means to hold said feed rollers including vertically sliding bearing elements and a spring biased means to hold said bearing elements in contacting position, motive means to drive said feed rollers, measuring means to measure the fur upon said conveyor means, and control means sensitive to said measuring means and effective to render said motive means ineffective and stop said feed rollers to pull said ribbon of fur apart when a predetermined quantity of fur has passed to said conveyor means.

2. In the art of forming bats in which fur is deposited upon cones, the steps of, blowing the fur and discharging the fur after it has been blown between the adjacent layers of a strip of sheet material in a roll as the sheet material is being rolled, unrolling the roll to thereby discharge the fur, and depositing the fur into a forming tower.

3. In the art of forming bats from fur, the steps of: rolling a strip of sheet material onto a reel; blowing fur and discharging the fur onto the sheet material as the sheet material is being rolled to form a ribbon of fur extending between the adjacent layers of sheet material on the reel; and unwinding the sheet material from the reel and delivering the fur to a forming tower to form bats.

4. In the art of forming bats in which fur is deposited upon cones, the steps of, blowing the fur and discharging the fur after it has been blown between the adjacent layers of paper in a roll as the paper is being rolled, unrolling the roll of paper to thereby discharge the fur, and depositing the fur into a forming tower.

5. In the art of forming bats from fur, the steps of: rolling a strip of sheet material into a roll; blowing fur and discharging it after it is blown between the layers of sheet material as the sheet material is being rolled up to form a composite bat comprising alternate layers of sheet material and fur; moving the bat to the forming machine; unrolling the sheet material and fur to thereby discharge the fur; and moving the fur in predetermined quantities to the forming tower.

6. In the art of forming bats from fur, the steps of: rolling a strip of sheet material into a roll; blowing fur and discharging it in ribbon form after it is blown between the layers of sheet material as the sheet material is being rolled up to form a composite roll comprising alternate layers of sheet material and fur; moving the roll to the forming machine; unrolling the sheet material and fur to thereby discharge the ribbon of fur; dividing the fur into predetermined quantities by tearing the ribbon of fur into proper lengths; and moving the fur in said predetermined quantities to the forming tower.

7. In hat making apparatus in which fur is received by the bat-forming machine in the form of a ribbon-like strip of fur which is rolled with a strip of sheet material such as paper, the combination of, a pair of feed rollers through which the strip of fur passes, conveyor means to receive the fur in strip form from said feed rollers, motive means to operate said feed rollers to thereby feed the fur, measuring means to measure the fur delivered to said conveyor means by said feed rollers, sheet handling means to automatically dispose of the strip of sheet material as the fur is delivered to said conveyor means, and control means sensitive to said measuring means and effective to render said motive means ineffective and stop said feed rollers and to sever the strip of fur when a predetermined quantity of fur has passed to said conveyor means.

8. In hat-making apparatus in which fur is received at the bat-forming machine in the form of a ribbon-like strip of fur, the combination of, feed means to receive a strip of fur of substantially uniform cross-section and to convey the strip of fur lengthwise while maintaining substantially the identical cross-section of the strip of fur and to sever the strip into successive lengths of fur each of which comprises a predetermined amount of fur, control means to regulate said feed means whereby the amount of fur in each length is controlled, conveyor means to receive the lengths of fur from said feed means and to forward them in extended condition away from said feed means, and fur-dividing and depositing means to receive the individual lengths of fur from said conveyor means with substantially the identical cross-section which the particular strip portion of fur had as it was received by the apparatus and to deposit the fur of each length in an air-born stream on a cone.

9. In hat-making apparatus in which fur is received by a bat-forming machine in the form of a roll of a ribbon-like strip of fur rolled in sheet material, the combination of, a frame construction having at one end a mounting for a composite roll of fur and sheet material, means adjacent said mounting to unroll the roll, weighing means having a horizontal surface positioned with its edge adjacent said last-named means whereby the strip of fur moves onto said horizontal surface lengthwise while maintaining substantially the identical cross-section of the strip of fur, means responsive to the amount of fur on said horizontal surface to sever the strip of fur each time that a predetermined quantity of fur is received on said surface, whereby the strip is severed into successive lengths of fur each of which comprises a predetermined amount of fur, conveyor means to receive the successive lengths of fur and to forward them in extended condition from said weighing means, a forming tower assembly including a cone, and fur-dividing and depositing means to receive the individual lengths of fur from said conveyor means with substantially the identical cross-section which the particular strip portion of fur had as it was received by the apparatus and to deposit the fur of each length in an air-born stream on a cone.

10. Apparatus as described in claim 9 wherein said horizontal surface is formed by an endless conveyor belt by which the fur is received and moved across the weighing means.

11. Apparatus as claimed in claim 9 wherein said horizontal surface is formed by a conveyor assembly including an endless belt and an electric motor and wherein said means to unroll the roll includes a pair of rolls through which the sheet material and the strip of fur pass, and wherein the apparatus includes a second pair of rolls mounted on said weighing means through which the strip of fur passes to said surface.

12. In the art of forming felt from fur, the steps of, blowing the fur and discharging it in a ribbon-like strip upon a strip of sheet material after it is blown, forming the composite strip into bats suitable for storage and handling without losing the identity of the original strip of fur, separating the strip of fur from the strip of sheet material, conveying the strip of fur in its original form to a former thereby to present to the former a strip of fur having substantially the identical cross-section which the strip had as it was discharged after being blown, and depositing the fur to form felt.

13. In the art of forming bats from fur, the steps of: rolling a strip of paper into a roll; blowing fur and discharging it in ribbon form after it is blown between the layers of paper as the paper is being rolled up, thereby to form a composite roll comprising alternate layers of paper and fur; moving the roll to the forming machine; unrolling the roll of paper and fur by passing the paper and fur through a pair of rollers; diverting the paper from the path of the fur with the result that the ribbon of fur is discharged; rerolling the paper; weighing the extended end of the ribbon of fur as it is discharged; dividing the fur into predetermined quantities by tearing the extended end of the ribbon of fur into proper lengths in accordance with the weight of each length; and moving each predetermined quantity of fur into a forming tower by a blowing and separating action where the fur is deposited upon a cone.

14. In hat-making apparatus in which fur is received in the form of a composite roll formed by a strip of fur deposited between the adjacent layers of a roll of sheet material and is deposited upon cones to form bats, the combination of: a forming tower assembly including, a cone, means to support the cone, and fur-dividing and blowing means, whereby predetermined quantities of fur are deposited upon the cone to form bats; and means to supply fur to said forming tower assembly comprising, feed means to unroll the composite roll of a strip of fur deposited between the layers of a roll of sheet material wherein the strip is of substantially uniform cross-section and to convey the strip of fur lengthwise while maintaining substantially the identical cross-section of the strip of fur and to sever the strip into successive lengths of fur corresponding in amounts to said predetermined quantities, control means to regulate said feed means whereby the amount of fur in each length is controlled, and conveyor means to receive the lengths of fur from said feed means and to forward them in extended condition away from said feed means, whereby each individual length of fur is forwarded to said fur-dividing and blowing means with substantially the identical cross-section which the particular strip portion of fur had when in the form of said composite roll.

15. Apparatus as described in claim 14 wherein said feed means includes a horizontal platform assembly with said control means being responsive to the amount of fur received by said platform assembly, and means to reroll and maintain constant tension on the strip of sheet material after it has been unrolled.

16. Apparatus as described in claim 14 wherein said control means has associated therewith weighing means to weigh each quantity of fur as it is being received by said feed means, and means to reroll the strip of sheet material after it has been unrolled.

17. In a hat-making apparatus in which fur is received in the form of a composite roll formed by a strip of fur deposited between the adjacent layers of a roll of sheet material, the combination of: a forming tower assembly including, wall means enclosing a space for a cone, a cone positioned in said space in an upright position to receive fur, cone-supporting means to support said cone for movement to and from said space; and means to supply fur to said forming tower comprising, means to support a composite roll of a strip of fur and sheet material, feed means to unroll the composite roll and discharge the strip of fur with the strip being maintained in substantially the identical condition which it had as part of the composite roll, means to sever the strip into successive lengths corresponding in amounts to the predetermined quantities which are deposited to form bats, means to regulate said feed means whereby the amount of fur in each length is controlled, conveyor means to receive the lengths of fur from said feed means and to forward them in extended condition away from said feed means, and fur-dividing and blowing means to receive the individual lengths of fur from said conveyor means with substantially the identical cross-section which the particular strip portion of fur had as part of said composite roll and to deposit the fur of each length in an airborn stream on a cone to form a bat.

JOHN E. KANE.